United States Patent [19]

Schontzler et al.

[11] E Re. 29,868

[45] Reissued Dec. 19, 1978

[54] FLUID FLOW MEASURING SYSTEM AND METHOD

[75] Inventors: James G. Schontzler; Wendall C. Gates, both of Santa Cruz; Victor L. Dagragnano, Redwood City, all of Calif.

[73] Assignee: Manning Environmental Corporation, Santa Cruz, Calif.

[21] Appl. No.: 640,411

[22] Filed: Dec. 15, 1975

Related U.S. Patent Documents

Reissue of:

[64] Patent No.: 3,866,028
Issued: Feb. 11, 1975
Appl. No.: 383,269
Filed: Jul. 27, 1973

[51] Int. Cl.[2] ..... G01F 1/00; G06G 9/00

[52] U.S. Cl. ..... 364/510; 73/215

[58] Field of Search ..... 235/151.34; 73/215, 73/313, 321; 61/22, 23

[56] References Cited

U.S. PATENT DOCUMENTS

| | | | |
|---|---|---|---|
| 1,992,780 | 2/1935 | Skeats | 73/215 |
| 3,693,445 | 9/1972 | Johnson | 73/313 X |
| 3,781,624 | 12/1973 | Tullis | 73/313 X |

*Primary Examiner*—Edward J. Wise
*Attorney, Agent, or Firm*—Flehr, Hohbach, Test, Albritton & Herbert

[57] ABSTRACT

A fluid flow level detector contacts a fluid surface in an open channel providing a fluid surface height signal related to a predetermined reference height level. The flow level detector immediately withdraws upon contacting the fluid surface and exhibits a time delay before subsequently seeking to regain surface contact. Auxiliary signals are produced related to specific predetermined fluid surface height levels. The fluid surface signal is directed to a computer where it is converted into a signal related to flow volume by a function read-only memory. Totalized flow volume is provided along with an optional time display recording.

21 Claims, 3 Drawing Figures

FLOW RATE RECORDER
SAMPLE RATE
CHANNEL TYPE
TOTAL FLOW
MAX. FLOW INPUT
LEVEL RECORDER
CHLORINATOR
FLOW DIVERTER

DAC-9-BBI
+15V
EXTERNAL RECORDER
INTERNAL RECORDER
INVERTER CIRCUIT
FUNCTION ROM
+5V
-9V
MSB
LSB
9316
9356
9024
9310
MSB
9 S COMP SW
LSB
8284
7474
CLOCK 1.5 KHz
CLOCK 1/MIN
20 Hz CLOCK
FLOW TOTALIZER
SAMPLER
9350
÷10
÷100
÷1000
X1000
X100
X10
DECADE SEL.
NC
R30
+15V
-15V
34
36
37
38
39
41
42
43
44
48
51
58
59

FLUID FLOW MEASURING SYSTEM AND METHOD

Matter enclosed in heavy brackets [ ] appears in the original patent but forms no part of this reissue specification; matter printed in italics indicates the additions made by reissue.

BACKGROUND OF THE INVENTION

This invention relates to a totalized flow volume indication system and more particularly to such a totalized flow volume system for use with open flow channels having a known cross sectional configuration.

A flow meter for measuring flow in open channels utilizing the fluid surface height requires a non-linear converter to transform the height data. The non-linear relationship is a function of the configuration of the channel through which the fluid passes. Hydraulic equations exist for various types of weirs, flumes, and round pipe channels. In the past, conversions have been made using mechanical analog cams which have produced inaccuracies and which required a great variety of cams for each size and basic configuration of channel. There is a need for a system which measures flow volume in open channels by detecting and producing a signal related to the fluid surface height, eliminating mechanical flow computation devices, and by providing accurate flow rates for particular basic open channel cross section configurations by utilizing the signal related to surface height.

SUMMARY AND OBJECTS OF THE INVENTION

A total flow measuring system is provided which contains means for detecting a fluid surface level and for continuously generating a signal relative to a predetermined reference level. The detecting means also provides auxiliary outputs for visual indications of specific predetermined fluid surface levels of interest and for transmittal to devices which may perform certain operations on the flowing fluid dependent upon fluid surface level. The continuously generated fluid surface level signal is directed to a computer where it is transposed into a flow volume indication by a function read-only memory. Storage and maximum flow input register means combine to provide counts to a totalizer which indicates total flow volume through the channel.

In general, it is an object of the present invention to provide a total flow measuring system which converts fluid surface level to flow volume.

Another object of the invention is to provide a total flow measuring system which requires a minimum of different parts for different flow channel configurations.

Another object of the present invention is to provide a total flow measuring system with auxiliary outputs for performing specific operations on the flowing medium at predetermined fluid surface levels.

Another object of the present invention is to provide a total flow measuring system which will provide a continuous time display recording of flow volume.

Another object of the present invention is to provide a total flow measuring system which will generate a sampling signal at predetermined increments of flow volume.

Another object of the present invention is to provide a total flow measuring system which provides a cumulative total of flow volume.

Additional objects and features of the invention will appear from the following description in which the preferred embodiment has been set forth in detail in conjunction with the accompanying drawings.

DESCRIPTION OF THE PREFERRED EMBODIMENTS

Figures 1, 2, 3, 4, 5:
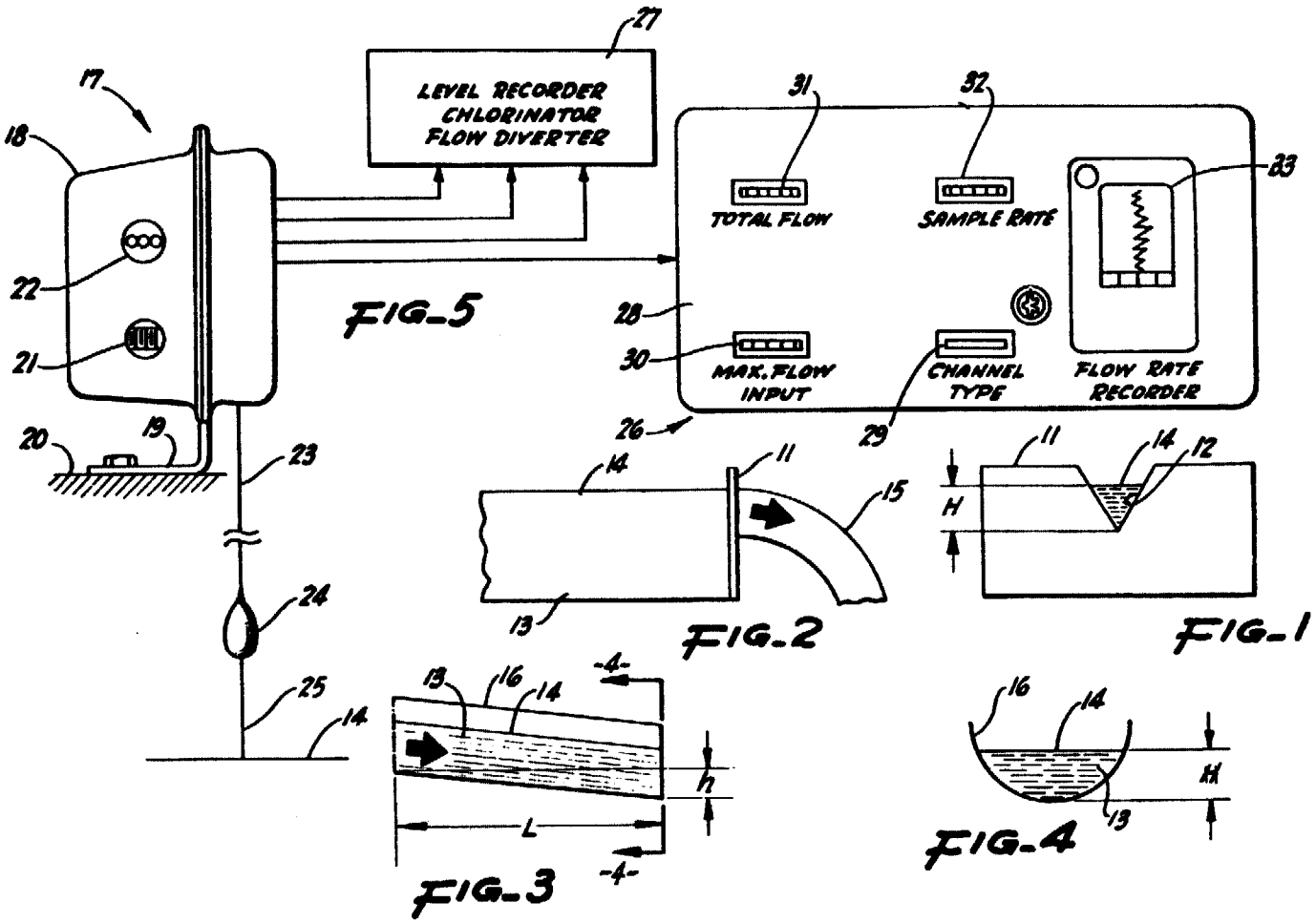
FIG. 1 is a front elevational view of a dam with a V-notch weir.
FIG. 2 is a side elevational view of the dam of FIG. 1.
FIG. 3 is a sectional view through the center of an open channel.
FIG. 4 is a sectional view along the line 4—4 of FIG. 3.
FIG. 5 is a schematic pictorial representation of the flow surface height detector and the flow volume computer.

The total flow measuring system and method described herein converts fluid surface height in an open channel to a flow volume through the utilizatin of a transfer function programmed into a read-only memory and associated adjustments to control signals related to other flow dimensions. Two situations herein may be noted as axamples where the system disclosed herein may be used to measure flow volume. FIG. 1 shows a front elevational view of a dam 11 having a V-notch weir 12 formed in the top surface. A body of fluid 13, water in this case, is shown in FIG. 2 having a free surface 14. The surface 14 is above the lower extremity of wier 12 and an efflux 15 is seen passing through weir 12. Relations for flow through weirs of various shapes as a function of height, $Q = Kf(H)$, are well known. The relation for flow through a V-notch weir is $Q = KH^{5/2}$. K is a constant of proportionality and H is the height of surface 14 above the lower extremity of weir 12. The second situation illustrated is flow through an open channel having a specified shape in cross section such as the circular cross section channel 16 seen in FIG. 4. The free surface 14 of the flowing fluid 13 as seen in FIG. 3 assumes the slope S of channel 16 which has a value defined by h/L for small slopes as noted. The hydraulic mean depth R of flow in open channels is defined as the ratio of cross sectional area A of the flow to wetted perimeter P of the flow channel. R therefore has a linear dimension and is obviously a function of H. The equation for velocity of flow in an open channel is $V = C\sqrt{RS}$. C is a dimensional coefficient depending on channel surface and cross section, and for steady uniform flow may be found through the empirical Manning equation $C = 1.49/n\ R^{1/6}$ n is a channel roughness factor which is available from tables, and is dependent upon the surface roughness characteristics of channel 16. The basic flow formula $Q = AV$ when set out in terms of the foregoing produces:

$$Q = AC\sqrt{RS} = 1.49A/n\ R^{2/3}S^{1/2}$$

$$Q = (1.49)/(n)\ A^{5/3}S^{1/2}/P^{2/3}$$

When S is measured and combined with the quantity in brackets as K', the remaining terms are seen to be functions of H whereby:

$$Q = K'f(h)$$

Referring to FIG. 5 a fluid surface level detector and transmitter 17 is shown having a waterproof cover 18, and a mounting base 19 which may be of any configuration to suit the circumstances. In FIG. 5 mounting is accomplished on a horizontal surface 20.

Waterproof cover 18 has a window 21 which displays a continuous indication of the height of fluid surface 14. A second window 22 provides visual access to a plurality of indicator lights responsive to predetermined detected levels of fluid surface 14. Extending from the bottom of waterproof cover 18 is a sheathed steel cable 23. The sheath on steel cable 23 is an insulating material and extends into a weight 24 which causes steel cable 23 to hang plumb from the bottom waterproof cover 18. Steel cable 23 extends through weight 24, and is attached electrically to a probe 25 of a conducting material. Probe 25 seeks the free surface 14 of a flowing liquid in an open channel during operation.

Flow level surface detector and transmitter 17 generates a signal proportional to the height of fluid surface 14 relative to a predetermined reference. A fluid surface height signal is transmitted to a flow volume computer 26. The flow level surface detector and transmitter 17 also generates auxiliary signals related to predetermined fluid surface heights, which are delivered to auxiliary equipment 27 which may be used by way of example for recording the level of free surface 14, chlorinating the fluid 13 or diverting the flow.

Flow volume computer 26 has a front panel 28 for receiving a function read-only memory module 29 for a specific open flow channel cross section configuration. Module 29 may be in the form of a cartridge for insertion into panel 28. Panel 28 also mounts a thumb-wheel adjustable maximum flow input register switch 30, and a cumulative total flow indicator 31. A sample rate adjustable thumb-wheel switch 32 and a time display flow volume recorder 33 may also be mounted in panel 28.

Figure 6:
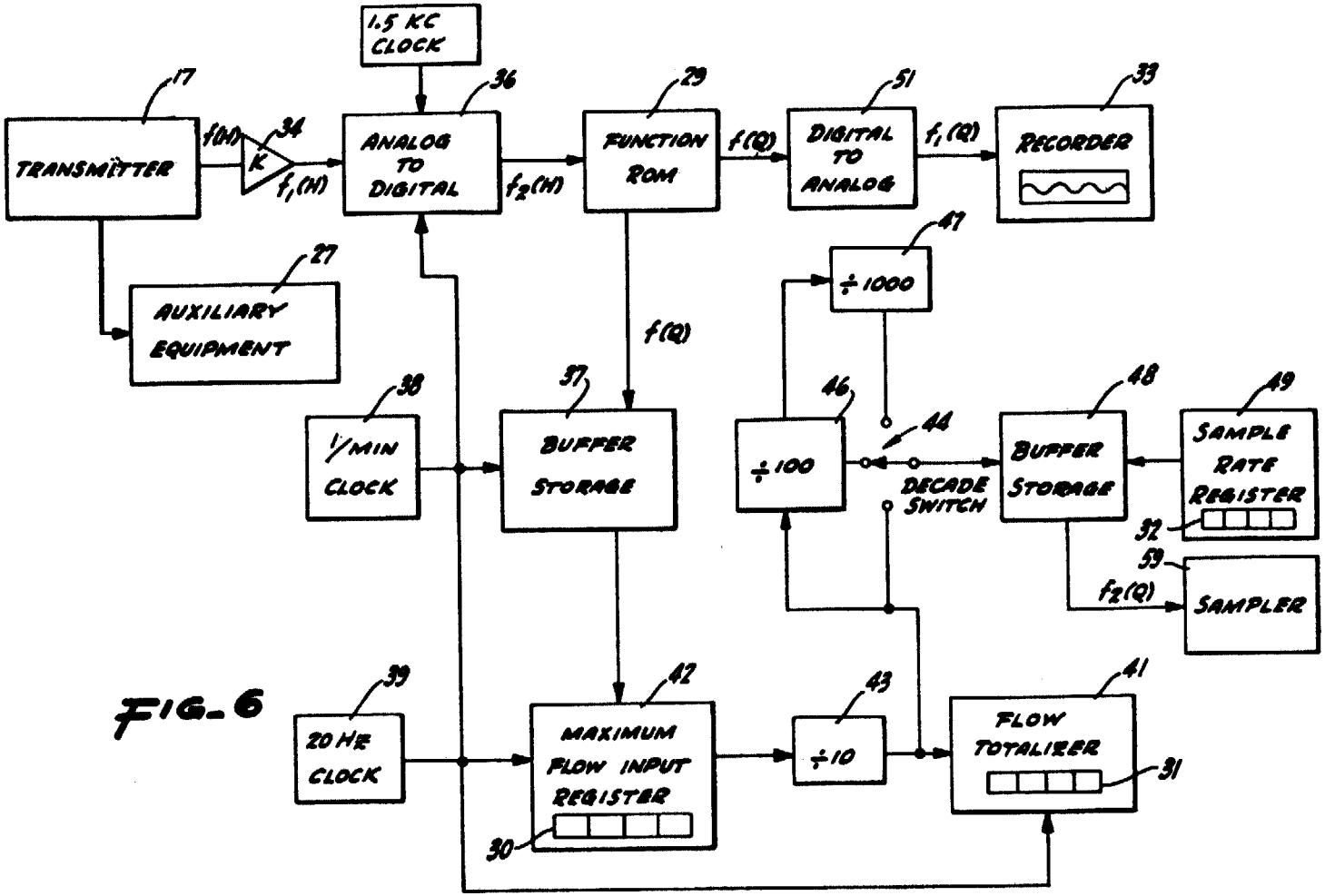
FIG. 6 is a block diagram of the flow surface height transmitter and the flow volume computer.

A block diagram of the system is shown in FIG. 6. The fluid level detector transmitter 17 produces an output signal which is indicative of the height of fluid surface 13. The height signal directed to a level setting amplifier 34. Additional outputs are generated by fluid level transmitter 17 responsive to predetermined levels of fluid surface 14 which are directed to auxiliary equipment 27. The output of level setting amplifier 34 is connected to an analog to digital converter 36. The digital output of converter 36 is related to the height of fluid surface 14. The digital output is applied to the function read-only memory 29. The function read-only memory 29 produces an output which is connected to a first buffer storage 37. A first clock 38 produces a periodic output, for example, one output per minute, which is directed to first buffer storage 37. A second clock 39 is also directed to first buffer storage 37 and also to analog to digital converter 36. Second clock 39 is also connected to flow totalizer 41 associated with cumulative total flow indicator 31.

A maximum flow input register 42 receives the stored data from first buffer storage 37. The output from maximum flow input register 42 is directed to a divide by 10 circuit 43. The output of the divide by 10 circuit 43 is directed to flow totalizer 41. A decade switch 44 may select a flow indication divided by 10 from the output of divider 43, divided by 100 from the output of a second divider 46, or divided by 1,000 from the output of a third divider 47. Decade switch 44 directs the selected signal to a second buffer storage 48. A sample rate register 49 associated with sample rate thumb wheel switch 32 is connected to second buffer storage 48 which provides an output to a sampler 59.

The output from function read-only memory 29 may also be directed to a digital to analog converter 51 which provides an output related to flow volume. The output from digital to analog converter 51 is directed to the time display recorder 33.

Figure 7:
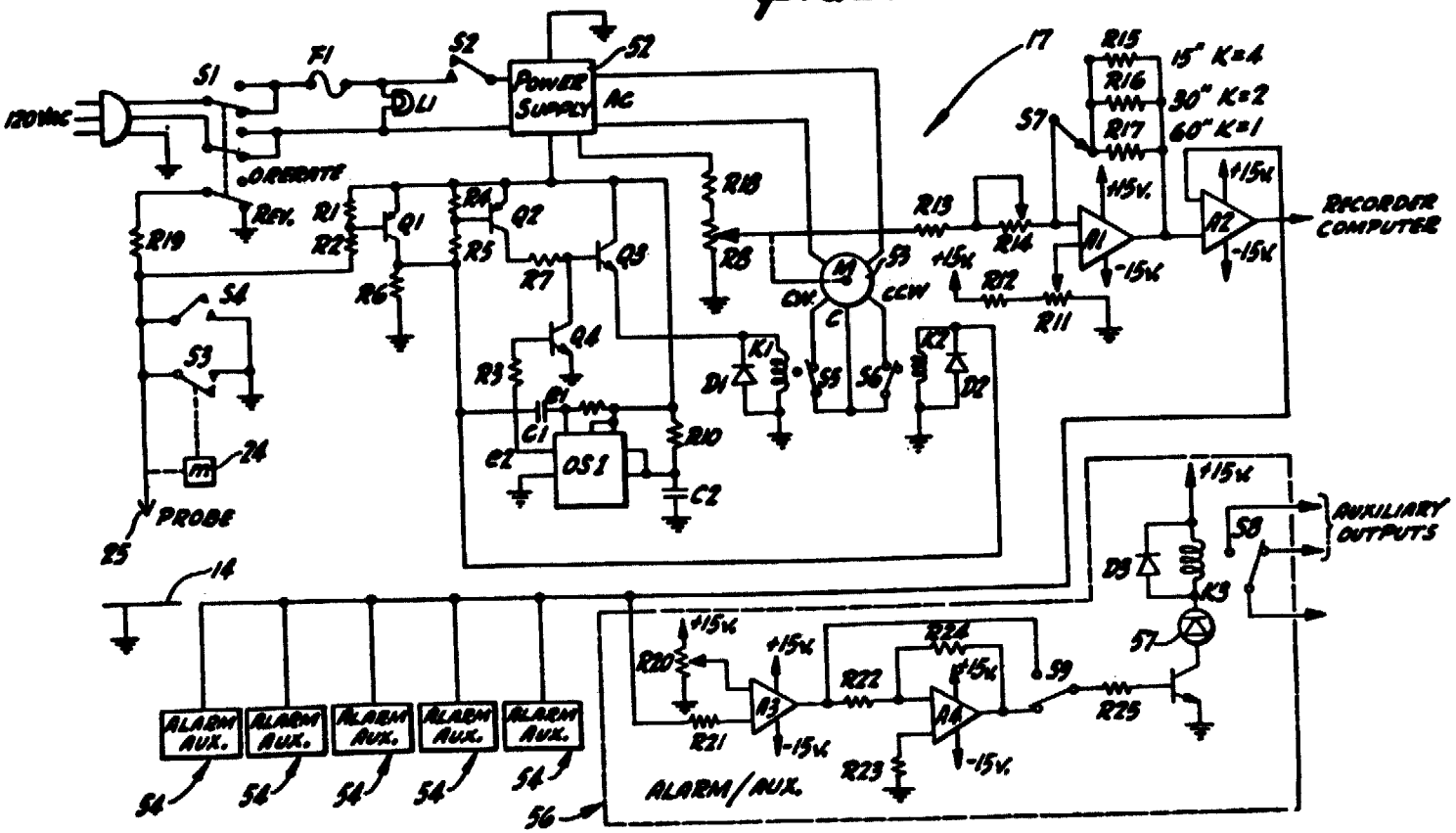
FIG. 7 is an electrical schematic of the flow surface height transmitter.

Turning now to FIG. 7 an electrical schematic of the probe 25 associated with transmitter 17 of FIGS. 5 and 6 is shown. An operate or reverse switch S1 is placed in the AC input line. The AC input line is fused at F1. A light L1 indicates the presence of AC power. An up-stop switch S2 is also in the AC input line. A power supply 52 provides ± 15 volts DC for the transmitter circuit and AC for a motor 53 for positioning probe 25 and driving potentiometer R8. Motor 53 is directionally controlled by alternately closing and opening switches S5 and S6 associated with relay coils K1 and K2 respectively. Relay coils K1 and K2 are connected to transistors Q3 and Q1 respectively. Transistor Q2 is connected to the base of transistor Q3 and to the collector of transistor Q4. Transistor Q4 is connected to the output of one shot number one. Time delay components R10 and C2 are also connected to one shot one. The collector of transistor Q1 is capacitance coupled to the input of one shot one. Resistors R1 through R7 are connected to perform biasing functions for transistors Q1, Q2, Q3 and Q4 as shown.

Probe 25 is connected to the base circuit of transistor Q1. An end of reel switch S4 and a slack switch S3 are also connected in the base circuit of transistor Q1.

The output from potentiometer R8 is directed to amplifier R1 which has selected gain values as determined by R15, R16, and R17 and the position of switch S7. A buffer amplifier A2 is connected to the output of amplifier A1 and provides an output to a remote recorder for recording the height of the fluid surface 14. The output of buffer amplifier A2 is also directed to a plurality of alarm and auxiliary circuits 54 typified by the circuit shown at 56. Buffer amplifier A2 is connected to the input of a voltage comparator A3. A reference input for comparator A3 is provided from a sliding contact on resistor R20. The output of voltage comparator A3 is presented at one terminal of switch S9 and is also delivered to the input of unity amplifier A4. The output of unity amplifier A4 is connected to a second terminal of switch S9. Switch S9 connects the output of either comparator A3 of unity amplifier A4 to the base of transistor Q5. Light emitting diode 57 (LED) is connected in the collector of transistor Q5 in series with relay coil K3 associated with switch S8. Switch S8 is connected to auxiliary equipment 27.

Figure 8:
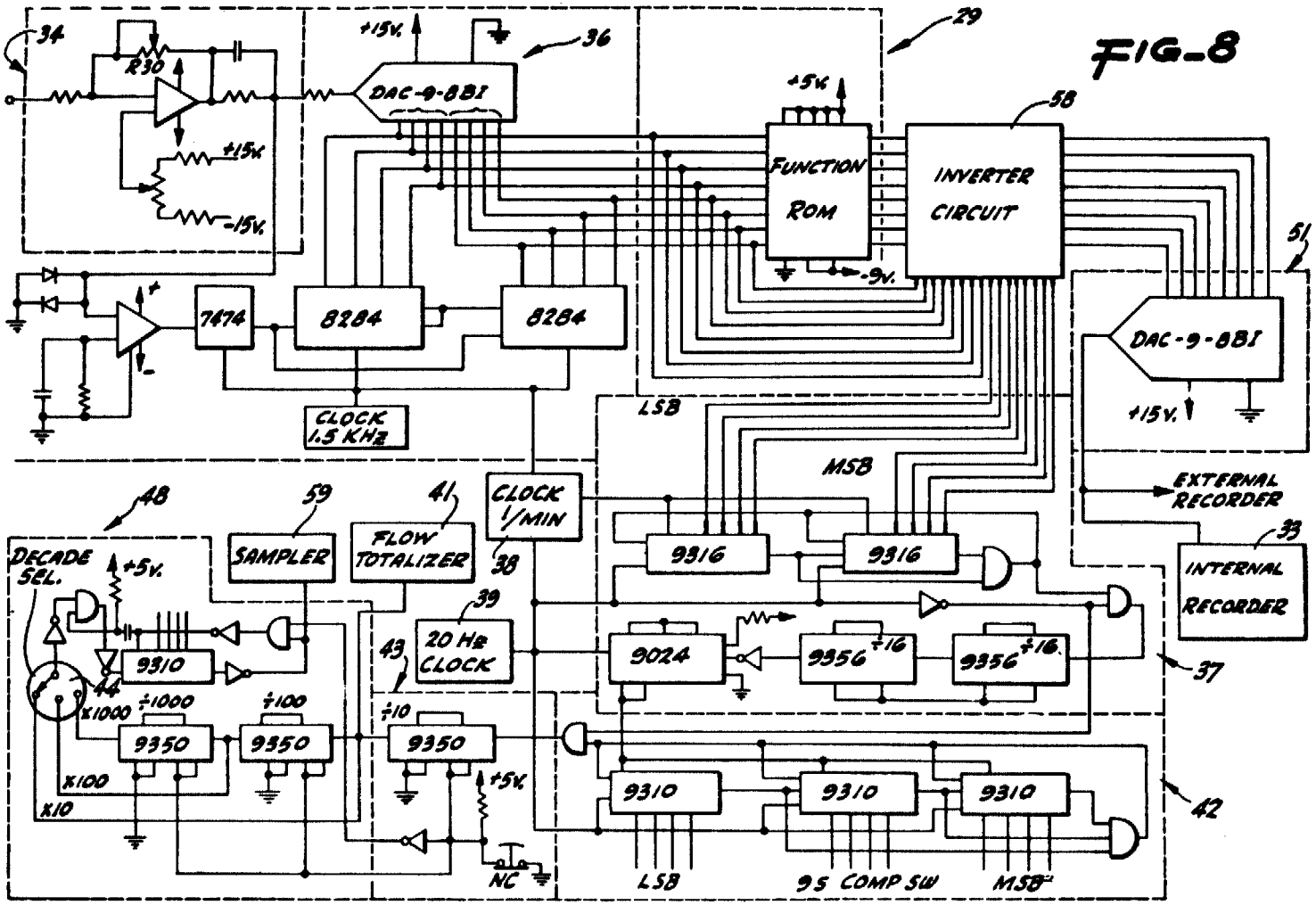
FIG. 8 is an electrical schematic of the flow volume computer.

Details of the blocks in FIG. 6 which were not covered in the description of FIG. 7 are shown in FIG. 8. The level setting amplifier 34 receives the output from transmitter 17. The output of level setting amplifier 34 is directed to analog to digital converter 36. Analog to digital converter 36 provides signals to the function read-only memory 29. Function read-only memory 29 and alalog to digital converter 36 both provide outputs for inverter circuit 58. Inverter circuit 58 provides outputs for an external recorder (not shown), or for the internal recorder 33 via digital to analog converter 51. Inverter circuit 58 also provides outputs connected to the first buffer storage 37. First buffer storage 37 is connected to the maximum flow input register 42 as shown. The 20 Hz clock 39 is connected to both first buffer storage 37 and maximum flow input register 42. The output of maximum flow input register 42 is connected to the divide by 10 circuit 43 which is connected to the second buffer storage 48 through the decade switch 44. The flow totalizer 41 is connected to the output of divide by 10 circuit 43. A sampler 59 is connected to the output of second buffer storage 48.

Turning now to the operation of the total flow measuring system reference is made to FIG. 7. To begin operation of the system switch S1 is placed in the operate position and up-stop switch S2 is manually closed. Power supply 52 is now energized and AC power is available to the field of motor 53. Plus DC voltage is provided to the emitter of transistor Q2 which is biased to a conducting condition by resistors R4 and R5 providing current to the base of transistor Q3. Transistor Q3 conducts, energizing relay coil K1, closing switch S5, causing motor 53 to turn in a direction to lower weight 24 and probe 25 toward the fluid surface 14. When probe 25 contacts fluid surface 14 a ground is provided for the base circuit for transistor Q1 causing Q1 to conduct. Q2 being a PNP device is turned off when its base is raised to the emitter potential. When Q2 stops conducting the base current is removed from Q3 turning it off and deenergizing relay coil K1, allowing switch S5 to open. A circuit is completed to ground through transistor Q1 and relay coil K2 closing switch S6 reversing motor 53 and raising probe 25 until it breaks contact with fluid surface 14. The base circuit for transistor Q1 is broken and it is shut off, allowing transistor Q2 to be biased once again to the conducting condition. When transistor Q1 turns off, relay coil K2 is deenergized, opening switch S6, stopping the rotation of motor 53 and the rise of probe 25. When transistor Q1 turns off and Q2 turns on, a negative going signal is seen at e1 which is directed to the trigger input of one shot number one. A positive going pulse, having a dwell time determined by the values of resistor R10 and capacitor C2, appears as e2 at the output of one shot one. The pulse e2 is connected to the base of transistor Q4, turning it on for the duration of pulse width e2. Conduction through transistor Q4 maintains the base of transistor Q3 at ground for the duration of pulse e2 preventing conduction through transistor Q3. At the end of pulse e2 conduction through transistor Q2 into the base of transistor Q3 turns transistor Q3 on, energizing relay coil K1 and closing switch S5, causing motor 53 to rotate in a direction to lower probe 25 toward the fluid surface 14. In this manner probe 25 contacts fluid surface 14 and immediately retracts therefrom. Upon breaking contact with fluid surface 14 motor 53 is stopped and both switches S5 and S6 are open for the delay time imposed by the pulse width of e2. Time delay components R10 and C2 provides a width for puse e2 of approximately 4 seconds in this embodiment.

Figure 9:
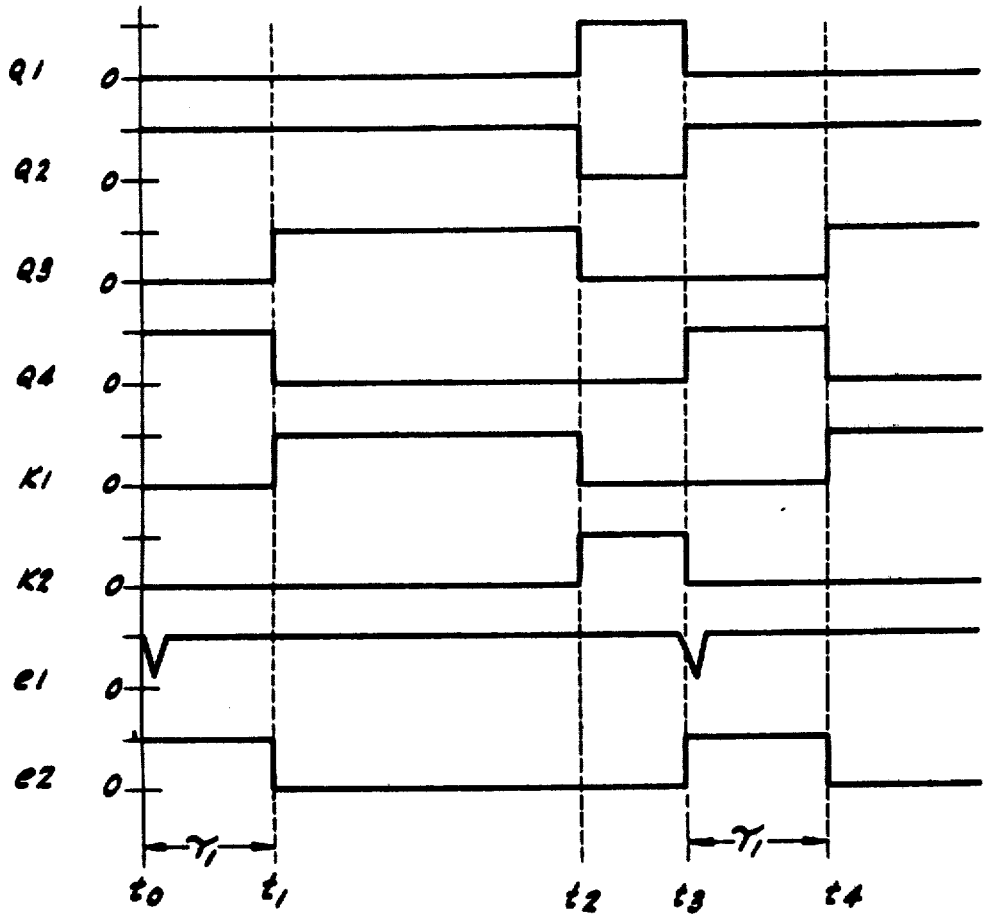
FIG. 9 is a timing diagram for the signals in the transmitter motor switching and time delay circuit.

Referring to FIG. 9 a timing diagram is shown relating the signals occurring in the transistor switching and delay circuit for motor 53. Time $t_o$ represents the time at which switch S2 is closed when probe 25 is not in contact with fluid surface 14. At $t_o$ transistor Q2 turns on, generating a negative going pulse e1. Pulse e1 triggers one shot one generating positive going pulse e2 as its output. The pulse e2 has a dwell time of $\tau_1$. Transistor Q4 is seen to conduct for the dwell time of pulse e2. At time $t_1$ when pulse e2 falls transistor Q3 is turned on since transistor Q2 is conducting current to the base of transistor Q3. Relay coil K1 is energized closing switch S5, causing motor 53 to rotate in a manner to lower probe 25 toward fluid surface 14. At time $t_2$ probe 25 contact fluid surface 14 completing the base circuit through transistor Q1 and turning Q1 on. When transistor Q1 turns on, transistor Q2 is thereby turned off. When transistor Q2 is turned off transistor Q3 is turned off. Relay coil K1 is deenergized opening switch S5, and relay coil K2 is energized through transistor Q1 closing switch S6 causing motor 53 to rotate to raise the probe 25. At time $t_3$ probe 25 loses contact with the fluid surface 14 causing transistor Q1 to turn off, transistor Q2 to turn on, and negative going pulse e1 to trigger one shot one to provide positive going pulse e2. e2 turns on transistor Q4, providing a delay for holding transistor Q3 off until time $t_4$. This cycle is repeated as probe 25 is again lowered toward the fluid surface 14.

Motor 53 is gear coupled to the shaft of circular potentiometer R8. The signal from potentiometer R8 is delivered to the input of amplifier A1 and the gain is adjusted by selection of R15 through R17 at switch S7. By way of example, for a 60 inch range for probe 25, motor 53 may turn potentiometer R8 through its complete revolution. In this case the gain provided by feedback resistor R17 may be unity and the output of amplifier A1 would traverse the same range as the output of potentiometer R8. In the event the range of probe 25 was restricted to 30 inches switch S7 may be set to select feedback resistor R16 which would provide in this example a gain of 2 in amplifier A1. The same output is now provided at the output of amplifier A1 for one half the travel through potentiometer R8. Should the probe 25 be restricted to a vertical travel of 15 inches resistor R15 may be selected as the feedback resistor around amplifier A1 providing a gain of 4. In this case an excursion through one quarter of the total excursion of potentiometer R8 would still provide output at amplifier A1 equivalent to full excursion of potentiometer R8. Amplifier A2 provides a buffering function and delivers the signal generated by the position of the shaft on potentiometer R8 to a recorder for continuously recording the level of fluid surface 14.

The output of amplifier A2 is also delivered to a plurality of alarm and auxiliary circuits 54. Circuit 56 is typical of the alarm and auxiliary circuits 54. Amplifier output A2 is delivered to the input of voltage comparator A3 which receives a reference voltage from potentiometer R20. When the output of amplifier A2 exceeds the reference voltage, comparator A3 produces an output connected to one terminal of switch S9 and to the input of amplifier A4. Amplifier A4 performs an inverting function and delivers the inverted output of comparator A3 to the other terminal of switch S9. Switch S9 connects inverted or non-inverted output of comparator A3 to the base of transistor Q5 depending on whether LED 57 is to be normally on or normally off. When transistor Q5 conducts, light emitting diode 57 turns on indicating the fluid surface 14 has achieved a predetermined level. Relay coil K3 is also energized actuating switch S8 for energizing auxiliary equipment such as an external recorder, a chlorinator, or some other device to perform a predetermined function at the selected fluid surface level.

Turning to FIG. 8 the output of transmitter circuit 17 is received at the input to level setting amplifier 34. As mentioned above the flow volume equation for a V-notch weir is $Q = AH^{5/2}$. The setting for maximum H is made by adjusting the gain of amplifier 34 at resistor R30 and is made to coincide with maximum flow rate in desired units by setting maximum flow input 30. The output of amplifier 34 is converted in the analog to digital converter 36 and provided to the function read-only memory 29. Digital output related to flow rates from maximum to zero are provided by ROM 29. In the example of FIGS. 1 and 2 the function ROM 29 is specifically programmed for a V-notch weir.

In the case of flow through a channel such as the circular cross section channel of FIGS. 3 and 4, a table of solutions for open channel flow using the Manning formula is entered to arrive at the maximum flow rate. The maximum H for the channel is a gain set at the output of amplifier 34 to coincide with the maximum flow rate which is set at 30 on panel 28. The function ROM 29 for the specific channel shape provides digital output related to any portion of the maximum flow as a function of H.

The function ROM 29 contains a program which provides a flow volume related output derived from the set maximum value of the term H in amplifier 34 and the maximum flow rate for a specific channel set in maximum flow input 30 in computer 26. The inverter circuit 58 is present merely to provide the proper polarity digital signals to digital to analog converter 51 and the first buffer storage 37. Digital to analog circuit 51 is an optional feature and is only used when an external recorder (not shown) or internal recorder 33 are present.

As seen in FIG. 6 and in more detail in FIG. 8, first buffer storage 37 collects data from function read-only memory 29. Clock 38 dumps the data once each minute into the maximum flow input register 42. Maximum flow input register 42 is filled to a certain extent by manual manipulation of the thumb wheel switches 30 on the panel face 28 of computer 26 as described above. When maximum flow input register 42 is filled by the periodic data inputs from first buffer storage 37 it transforms its capacity to flow totalizer 41 through divide by 10 circuit 43. Any remainder received from first buffer storage 37 is retained in maximum flow input register 42 until the next time it fills and transfers. 20 Hz clock 39 is directed to flow totalizer 41 for driving the totalizer motor which provides an indication of cumulative flow volume at total flow indicator 31.

Decade switch 44 in FIGS. 6 and 8 is present to provide a scaling factor for the input to second buffer storage 48. When large flow volumes are required to pass between samples, decade switch 44 may keep the flow units within the range of second buffer storage 48. Sample rate register 49 is set at thumb wheel switch 32 in the same units of flow volume which are set at the maximum flow input switch 30. Thus when data equivalent to the setting in sample rate register 49 has accumulated in second buffer storage 48, an output signal which is a function of flow is directed to the sampler 59.

A total flow measuring system has been disclosed which provides cumulative flow volume indication by detecting the level of the flow surface in an open channel which has known cross section configuration. A system is described which uses a minimum number of moving parts, and which provides outputs related to predetermined surface levels for performing specified operations on the flowing medium. A continuous cumulative total and a time display of flow volume is provided and a setting providing for a periodic sampling operation as a function of flow may be made.

What is claimed is:

1. A total flow measuring system for liquid flow through a channel having a predetermined cross section shape comprising, means for detecting a fluid surface level in the channel, *first* means *coupled to said means for detecting* for providing a signal related to fluid surface level relative to a predetermined reference level *second means coupled to said means for detecting for visually indicating existing surface height,* computer means for receiving said signal related to surface level and converting said signal to a digital signal, and program means for receiving said digital signal and providing output indicative of total flow volume.

[2. A total flow measuring system as in claim 1 together with means connected to said means for detecting a fluid surface level for visually indicating existing surface height.]

3. A total flow measuring system comprising means for detecting a fluid surface level, means for providing a signal related to fluid surface level relative to a predetermined reference level, computer means for receiving said signal related to surface level and converting said signal to total flow volume, and circuit means responsive to predetermined values of said signal related to fluid surface level for providing a plurality of auxiliary signals, and means responsive to said auxiliary signals for providing a plurality of predetermined operations on the fluid.

4. A total flow measuring system as in claim 3 wherein said means responsive to said auxiliary signals comprise alarm means for indicating predetermined fluid surface levels.

5. A total flow measuring system as in claim 3 wherein said circuit means responsive to predetermined values of said signal comprises a plurality of voltage comparators, and wherein said means responsive to said plurality of auxiliary signals comprise a plurality of lights for indicating fluid surface levels beyond predetermined limits.

6. A total flow measuring system comprising means for detecting a fluid surface level, means for providing a signal related to fluid surface level relative to a predetermined reference signal, computer means for receiving said signal related to surface level and converting said signal to total flow volume, wherein said means for detecting a fluid surface level comprises a probe for contacting the fluid surface, a drive motor for vertically positioning said probe upward and downward, and switching means for reversing rotation of said drive motor, together with means for delaying downward positioning of said probe following upward positioning.

7. A total flow measuring system comprising means for detecting a fluid surface level, means for providing a signal related to fluid surface level relative to a predetermined reference level, computer means for receiving said signal related to surface level and converting said signal to total flow volume, wherein said computer means comprises an amplifier for receiving and scaling said signal related to fluid surface level and providing an analog output related thereto, an analog to digital converter for receiving said analog output and providing a digital output related thereto, a function read-only memory for receiving said digital output and providing an additional digital output related to flow volume, storage means for receiving and storing said additional digital output, a maximum flow input register for receiving said stored additional digital output and for providing a flow output, timing means for transferring said additional output to said maximum flow input register at predetermined time intervals, and a totalizer for receiving said flow output, whereby a continuous flow total is indicated.

8. A total flow measuring system as in claim 7 together with an additional storage means for receiving the flow output of said maximum flow register and a sample rate register for preselecting a sample flow quantity connected to said additional storage means, whereby said additional storage means produces a sampler output for each preselected flow quantity increment.

9. A total flow measuring system as in claim 7 together with a digital to analog converter for receiving said additional digital output and providing an analog output related to flow volume, a recorder for receiving said analog output and presenting a time display of said flow volume.

10. A method of providing total flow measurement comprising the steps of selecting a reference level for a fluid surface level, detecting the height of the fluid surface level relative to the reference level, generating a signal related to the relative height of the fluid surface level, transmitting the signal to a computer, converting the signal to a digital signal, connecting the digital signal to a function read-only memory for producing a digital flow volume signal, storing the digital flow volume signal in a buffer storage, transferring the stored digital flow volume signal to a maximum flow input register at predetermined periods of time, filling the maximum flow input register with the stored signal, and transferring the flow input register counts to a flow totalizer when filled.

11. A method of providing total flow measurement as in claim 10 together with the steps of converting the digital flow volume signal to an analog flow volume signal, and recording the analog flow volume signal on a time display.

12. A method of providing total flow measurement as in claim 10 together with the steps of storing the maximum flow input register counts in an additional buffer storage, preselecting a sample flow increment, introducing the sample flow increment to the additional buffer storage, thereby providing an output from the additional buffer storage at the preselected sample flow increments when it becomes filled.

*13. A fluid flow measuring system for liquid flow through a channel having a predetermined cross section shape comprising means for detecting a fluid surface level in the channel, means coupled to said means for detecting for providing a signal related to fluid surface level relative to a predetermined reference level, means for receiving said signal related to surface level and converting said signal to a digital signal related to surface level, a console for housing portions of the system, a front panel on said console having a plug-in aperture therethrough, and a function read-only memory fitting into said plug-in aperture, thereby receiving said digital signal related to surface level and providing output indicative of flow rate.*

*14. A fluid flow measuring system as in claim 13 together with a digital to analog converter for providing a flow rate analog signal therefrom.*

*15. A fluid flow measuring system as in claim 13 together with a recorder for receiving said output indicative of flow rate for maintaining a permanent record thereof.*

*16. A fluid flow measuring system for liquid flow having a free surface and flowing through a channel having a predetermined cross section shape, comprising means for detecting the free surface level in the channel and for providing a signal related to the height of the free surface relative to a predetermined reference, electronic means for receiving said signal related to the height of the free surface and for providing a first digital signal related thereto, a read-only memory having a preset program therein corresponding to the predetermined cross section shape of the channel and providing a second digital signal related to flow rate through the channel, and means for receiving said second digital signal and for providing analog output indicative of flow rate through the channel.*

*17. A total flow measuring system for liquid flow through a channel having a predetermined cross section shape, comprising means for detecting a fluid surface level in the channel, means for providing a signal related to fluid surface level relative to a predetermined reference signal, a computer panel having a plug-in aperture therein, computer means including a read-only memory removably inserted in said plug-in aperture having a preset program therein determined by the predetermined cross section shape of the channel, said read-only memory receiving said signal related to surface level and converting said signal to a digital signal indicative of flow rate, and means for receiving said digital signal and providing an indication of flow rate.*

*18. A method of measuring fluid flow comprising the steps of selecting a reference signal for a fluid surface level, detecting the height of the fluid surface level relative to the reference level, generating a digital signal related to the relative height of the fluid surface level, plugging a function read-only memory in to receive the digital height signal, and producing a signal from the function read-only memory which is related to fluid flow rate.*

*19. A method as claimed in claim 18 wherein the signal from the function read-only memory is another digital signal, together with the steps of converting the other digital signal to an analog signal, and coupling the analog signal to a fluid flow rate display.*

*20. A method as in claim 18 together with the step of connecting the signal from the function read-only memory to a display for the fluid flow rate.*

*21. A fluid flow measuring system for measuring liquid flow through a channel having a predetermined cross section shape, comprising means for detecting a fluid surface level and for providing a signal related thereto relative to a predetermined reference level, means for scaling said signal related to fluid surface level and providing a scaled level signal related to maximum flow height through the channel, and means coupled to receive said scaled level signal including a function read-only memory containing a program corresponding to the predetermined cross section and converting said scaled level signal to a digital signal providing data related to flow rate through the channel, whereby flow rate through any cross section configuration channel may be determined by adjustment of said means for scaling and selection of said read-only memory program.*

*22. A fluid flow measuring system as in claim 21 together with means for storing said digital signal data, said means for storing including means for setting therein maximum flow rate through the channel in desired units at said maximum flow height, a flow totalizer for receiving said stored digital signal data providing a cumulative flow indication.*

* * * * *